Patented Sept. 2, 1952

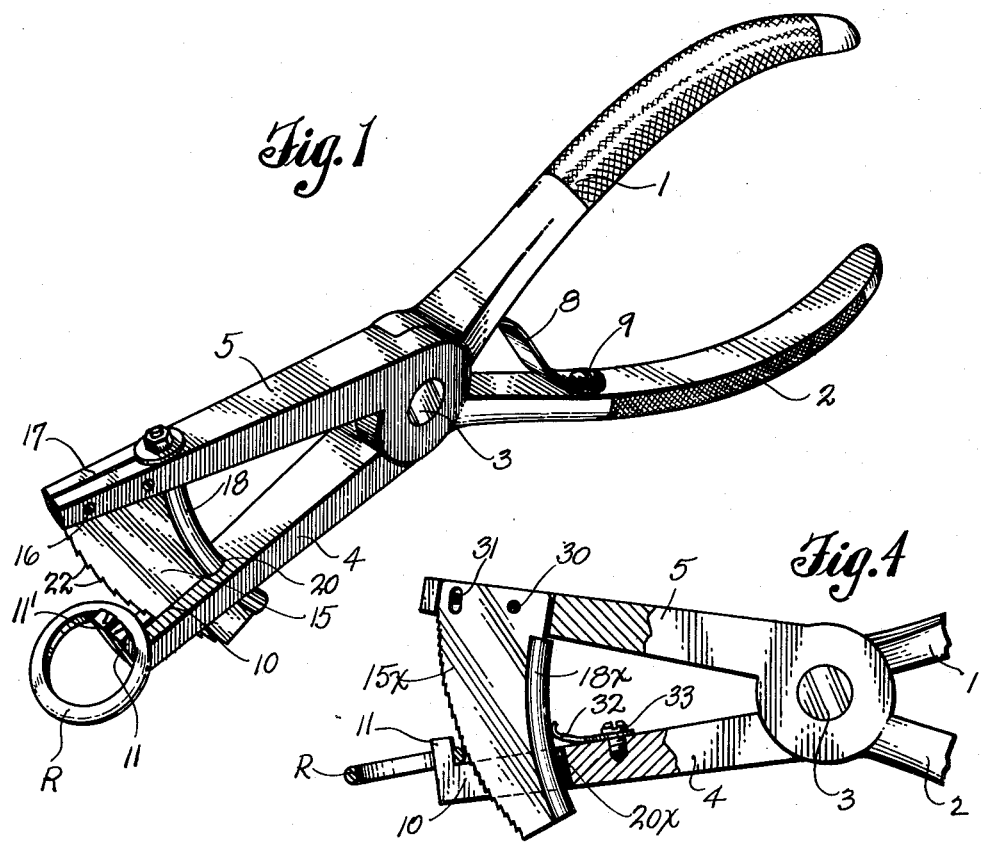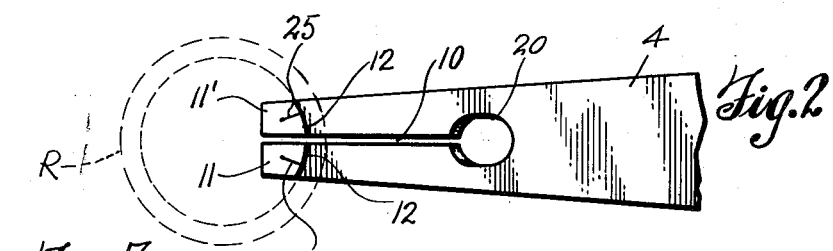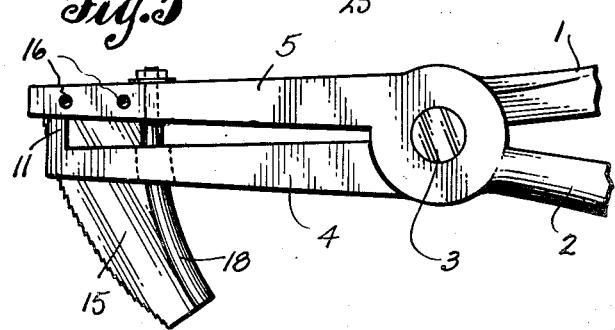

2,608,748

UNITED STATES PATENT OFFICE 2,608,748

RING SIZING TOOL

Ersel F. Kirkwood, Salem, Oreg.

Application May 15, 1948, Serial No. 27,251

2 Claims. (Cl. 29—75)

This invention relates to improvements in ring cutting tools and it has reference more particularly to a device whereby a finger ring may be easily and accurately cut as may be required for sizing it; that is, for making it of smaller or of larger ring size.

It is the principal object of my invention to provide a hand tool designed for accomplishing the above stated cutting operation, that will hold the ring secure while a cut is being made and will so hold it relative to the cutting blade that the cut will be made in a plane that is exactly in the radial axial plane of the ring and will insure that the ends of the band that are to be joined together after a piece has been cut out, can be brought flatly together in a perfect joint for soldering.

It is also an object of my invention to provide a ring cutting tool of the above stated character in the general form of a pair of hand pliers and wherein the cutting tool comprises a saw blade attached to one of the jaw portions of the tool, and formed with cutting teeth that have such definite and predetermined spacing that, by reason of the manner of mounting the blade and its mode of operation, they will successively pass through the ring and each will clear itself from the ring before the other enters.

It is also an object of my invention to provide a cutting tool equipped with opposedly related jaws, one of which is equipped to locate and retain the ring in place for the cutting operation, and the other mounts the saw. Furthermore, a tool wherein the ring retaining means is in the nature of abutments against which the ring is disposed and which are calibrated in a manner that makes possible an easy and quick setting or placing of the ring for cutting out portions therefrom that will reduce the ring by definite ring sizes.

Still further objects of the invention reside in details of construction and combination of parts embodied in the device and in their mode of operation, as will hereinafter be fully described.

In accomplishing these and other objects of the invention, I have provided the improved details of construction, the preferred forms of which are illustrated in the accompanying drawings, wherein:

Fig. 1 is a perspective view of a ring cutting tool embodying the improvements of the present invention therein, and showing the manner of applying a ring thereto for cutting.

Fig. 2 is an enlarged plan, or inner face view, of the ring holding jaw of the cutting tool.

Fig. 3 is a side view of the jaw portions of the tool as closed together.

Fig. 4 is a detail of jaw portions of a ring cutting tool showing an alternative method of mounting the blade; parts of the jaws being broken away for better understanding.

Referring more in detail to the drawings:

The present tool, in its preferred form of construction as shown in Fig. 1, is of pliers form, in that it comprises two crossed and pivotally joined levers equipped with handle grip portions 1 and 2 that have end portions thereof fitted and joined by a pivot bolt or pin 3. The levers are extended beyond the pivot 3 as opposedly related jaws 4 and 5, and these may be opened apart or clamped together by similar action of the handle portions 1 and 2. To facilitate the opening of the jaws, a leaf spring 8 is fixed to the inside of one of the handle portions, as by means of a screw 9 shown in Fig. 1, and has a free end portion disposed to yieldingly bear against the opposite handle, thus to urge the handle members apart and, in this way, to urge the jaws toward open position as in Figs. 1 and 4.

In the showing of parts in the present drawing, the lower jaw 4 is designated as the ring holding jaw. It is provided along its outer end portion with a longitudinal slot 10, and at the end of the jaw, at opposite sides of the slot, are upstanding abutments 11—11', the inner surfaces of which are of cylindrical curvature as noted as 12 in Fig. 2. These surfaces are perpendicular to the face of the jaw from which they extend and the center of curvature is in the line of the slot 10, so that when a ring of normal size is applied to the jaw, as indicated in Fig. 2, the inner surface of the band may be caused to engage flatly against the surfaces of cylindrical curvature of both abutments.

The band cutting blade 15 comprises a flat piece or plate of suitable metal, fixed at one end in the upper jaw by suitable means, for example, by means of studs or pins 16 as noted in Figs. 1 and 3. Preferably the upper, or mounting end of the blade 15 is disposed in a longitudinal slot 17 in the jaw 5, and the lower end portion of the blade is reciprocally contained in the slot 11 of the lower jaw. The blade metal is preferably quite thin; therefore, to give the blade required strength and stiffness, a back bar 18 is fixed thereto. This bar is arcuately curved about the axial center of pivot pin 3 and is reciprocally contained in a guide opening 20 in the lower jaw. The outer edge of the blade is equipped with cutting teeth 22, spaced a distance from each other that is approximately the width of the ring so that in the action of the blade in cutting a ring, effected by closing the jaws 4 and 5 from the position of Fig. 1 to that of Fig. 3, each tooth will clear the band as the next one enters it. The increase of radius of the toothed portion of the saw, from end to end, as measured from the pivot center of pin 3, is somewhat more than the radial distance through the band.

To use the tool, assuming it to be constructed as above described, the ring that is to be cut, designated at R in Figs. 1, 2 and 4, is placed against the lower jaw, to extend in a plane that coincides with the plane of the inner surface of the jaw, with the inside surface of the ring or band drawn against the cylindrically curved inside surfaces 12 of the two abutments 11—11'. Then by means of the handle members, 1 and 2, the jaws 4 and 5 are actuated from open position toward each other. This brings the toothed edge of the saw blade 15 against the band, as in Fig. 4, and with the farther closing of the jaws causes the teeth 22, in succession, to cut through the band; each tooth deepening the cut until the band is completely severed.

To make possible an easy measuring of the length of a section to be removed from a band, I have placed marks, as at 25 in Fig. 2, on the end surfaces of the abutments 11—11'; these marks being spaced laterally a distance equal to one ring size from the plane of the cut to be made by a blade. Thus, if a band is to be decreased by one ring size, it is first cut through at a selected place and then turned to a position at which the cut is registered or aligned with one of the marks 25. Then a second cut is made. This will cut from the band a section equal to one ring size. Sections of lesser or greater length are judged accordingly by reference to these size calibrations on the abutments.

In Fig. 4, I have illustrated an alternative form of construction using exactly the same form of handle and jaw construction as above described but wherein the saw blade 15x is pivoted for limited oscillating movement along the jaw slot 10. This manner of mounting is accomplished by means of a pivot pin 30 passed directly through the jaw and one corner of the blade. The other corner of the blade has a pin and slot connection with the jaw as at 31 that permits the limited oscillating action of the blade so that its free end may swing toward or from the abutment. In this case the guide opening 20x is somewhat elongated along the jaw. On the lower jaw, a leaf spring 32 is secured by screw 33 in position to press outwardly against the back bar 18x of the blade to yieldingly urge it against the band R as applied to the jaws for cutting. In this blade, 15x, the teeth may be spaced as in the device of Fig. 1 or closer as may be desired.

The advantages of tools of this particular type, made according to Figs. 1 or 4, reside in the fact that the cut through the band will always be clean cut and exactly in the radial axial plane of the band. Therefore, the ends at opposite sides of a cut may be brought flatly together in a close fitting joint suitable for soldering and the finished joint cannot be detected. Sizing of rings is made easy and with accuracy.

Changes in size and proportion of parts may be made, to meet various requirements or conditions, without departing from the spirit of the invention.

Having thus described my invention, what I claim as new therein and desire to secure by Letters Patent is:

1. A ring sizing tool of the character described comprising a pair of crossed and pivotally joined handle levers, terminating in oppositely related upper and lower jaws that are movable toward and from each other with the closing and opening action of the handle levers, an abutment extended upwardly from the inner face of the lower jaw at the end thereof, against which that part of a ring through which a cut is to be made may be engaged to hold it for the cutting operation, and there being a longitudinal slot in the lower jaw, passing through the abutment, a flat saw blade pivotally fixed to the upper jaw and reciprocally contained in the slot at the inside of the abutment and having a longitudinal, toothed edge that, with the closing movement of the jaws will engage with that part of the ring disposed against the lower jaw and abutment to progressively cut therethrough toward the abutment.

2. A ring sizing tool of the character described comprising a pair of crossed and pivotally joined hand levers terminating in oppositely related upper and lower jaws that are movable toward and from each other with the closing and opening action of the handle levers, an abutment formed on the inner face of the lower jaw, and said jaw having a slot formed longitudinally therein and extending through the abutment, a flat saw blade fixed at one end in the upper jaw and extending reciprocally through the slot of the lower jaw, and having a toothed longitudinal outer edge adapted, on closing of the jaws from an open position, to move in cutting contact with a ring that may be disposed against the said abutment; said blade being pivotally fixed to the upper jaw for oscillating action in the guide slot, a spring fixed to a jaw and bears against the blade to urge it toward the abutment, and the blade having the teeth thereof spaced at such distance therealong that each will form its cut across the ring before the next tooth starts its cutting operation.

ERSEL F. KIRKWOOD.

REFERENCES CITED

The following references are of record in the file of this patent:

UNITED STATES PATENTS

| Number | Name | Date |
|---|---|---|
| 41,725 | Shellaberger | Feb. 23, 1864 |
| 137,745 | Whitney | Apr. 8, 1873 |
| 367,167 | Smith | July 26, 1887 |
| 1,867,342 | Weig | July 12, 1932 |
| 2,007,355 | Wallace | July 9, 1935 |
| 2,415,271 | Baumann | Feb. 4, 1947 |